United States Patent [19]

Morgan

[11] 3,928,540
[45] Dec. 23, 1975

[54] PROCESS FOR PREPARING SILICA PIGMENT

[75] Inventor: James E. Morgan, Barberton, Ohio

[73] Assignee: PPG Industries, Inc., Pittsburgh, Pa.

[22] Filed: Feb. 8, 1974

[21] Appl. No.: 440,942

Related U.S. Application Data

[63] Continuation-in-part of Ser. No. 164,843, July 26, 1971, abandoned.

[52] U.S. Cl.............. 423/339; 423/335; 106/288 B
[51] Int. Cl.$^2$...................... C01B 33/18; C09C 1/28
[58] Field of Search........... 423/339, 332, 335, 338; 106/288 B

[56] References Cited
UNITED STATES PATENTS

| | | | |
|---|---|---|---|
| 2,863,727 | 12/1958 | Thornhill et al. | 423/339 |
| 3,085,861 | 4/1963 | Thornhill et al. | 423/339 |
| 3,235,331 | 2/1966 | Nauroth et al. | 423/339 |
| 3,712,941 | 1/1973 | Myers | 423/332 |
| 3,730,749 | 5/1973 | Morgan | 423/339 X |

*Primary Examiner*—Edward Stern
*Attorney, Agent, or Firm*—Irwin M. Stein

[57] ABSTRACT

Finely-divided precipitated silica useful as a rubber reinforcing pigment and for opacifying paper is prepared by acidifying an aqueous alkali metal silicate solution with acidifying agent until a slurry of finely-divided precipitated silica is obtained, the slurry having reached a viscosity of at least 550 centipoises. Further alkali metal silicate is added to the slurry and the resulting mixture acidified with further acidifying agent to precipitate further finely-divided silica. When recovered by filtration, the filter cake of precipitated silica has an increased solids content.

20 Claims, No Drawings

PROCESS FOR PREPARING SILICA PIGMENT

CROSS REFERENCE TO RELATED APPLICATIONS

This application is a continuation-in-part application of my co-pending application Ser. No. 164,843, filed July 26, 1971 for IMPROVED PROCESS FOR PREPARING SILICA PIGMENT, now abandoned.

DESCRIPTION OF THE INVENTION

The preparation of finely-divided precipitated silica pigment by acidification of an aqueous alkali metal silicate solution is known. See, for example, U.S. Pat. Nos. 2,940,830, 3,085,861, and 3,235,331. In a typical method, such as described in U.S. Pat. No. 2,940,830, a pool of an aqueous solution of alkali metal silicate containing from 10 to 150 grams of $SiO_2$ per liter, is acidified gradually with an acidifying agent, such as carbon dioxide, until the alkali metal oxide content of the solution is substantially neutralized. During the acidification, finely-divided precipitated silica is formed. Following neutralization, the pH of the slurry is adjusted to about 7 and the precipitated silica recovered.

In order to produce a finely-divided precipitated silica that is useful for reinforcing rubber compositions, i.e., a rubber reinforcing pigment, it has been regarded heretofore as essential, or at least preferable, that the silica pigment have an average ultimate particle size of from 0.0075 to 0.10 microns, preferably from about 0.015 to about 0.050 microns, and a surface area of from about 40 to 500 square meters per gram, as measured by the Brunauer-Emmett-Teller (B.E.T.) method of determining surface area by nitrogen adsorption. Surface area alone may not be an accurate measurement of determination of particle size since coarse porous pigments can have a high surface area.

The process for preparing precipitated silica useful as a rubber reinforcing pigment, i.e., a silica pigment having the abovedescribed preferred properties, is considered complex and requiring careful control of the acidification conditions including the ratio of $SiO_2$ to alkali metal oxide ($M_2O$) in the alkali metal silicate solution. Further, precipitated silica is commonly produced by batch methods. Thus, increased production of such pigment is generally associated with increased capital investment.

It has now been discovered that finely-divided precipitated silica pigment that is useful for rubber reinforcement can be produced at increased production rates without the need for additional capital investment in equipment such as acidification tanks. It has been found that the aforementioned benefits can be obtained by acidifying an aqueous solution of alkali metal silicate with acidifying agent until at least partial precipitation of the silica pigment occurs, thereby forming a slurry of precipitated silica that has attained a viscosity of at least 550 centipoises and thereafter adding to the slurry from 10 to 200 weight percent of further alkali metal silicate, based on the amount of alkali metal silicate used to prepare the said slurry. Further acidifying agent is added to the resulting mixture to thereby precipitate further finely-divided silica. The final slurry of precipitated silica has an increased solids content, as evidenced by the increase in filter cake solids and exhibits acceptable settling and filtration properties.

Because the filter cake is higher in solids content, less water is required to be evaporated therefrom and therefore, less energy is required to dry the filter cake produced in accordance with the present process.

The precipitated silica prepared in this manner, as compared to precipitated silica produced without the addition of further alkali metal silicate, exhibits a moderate increase in particle size and improved rubber processing and vulcanization characteristics. Further, the silica product is of higher purity for the reason that fewer insoluble salts are present therein as a consequence of the reduction in water content of the filter cake. The silica product is more soluble in caustic (sodium hydroxide) than silica prepared without the addition of further alkali metal silicate, and disperses with less expenditure of energy in vulcanizable rubber formulations without the resulting visible specks or chunks of reinforcing silica pigment.

DETAILED DESCRIPTION

In the acidification of a pool of an aqueous solution of alkali metal silicate to precipitate finely-divided silica, a substantial increase in the viscosity of the pool occurs after the alkali metal silicate is partially neutralized. When sodium silicate is the alkali metal silicate and carbon dioxide the acidification reagent, the aforementioned increase in viscosity rises to a maximum when the sodium silicate is neutralized to between about 25 percent and about 70 percent of stoichiometry based on the formation of the normal salt, i.e., sodium carbonate, as distinguished from the acid salt, i.e., sodium bicarbonate. Viscosities of 2,000 centipoises or higher are often attained at this maximum point. The amount of viscosity increase and the neutralization point at which the maximum increase occurs depends upon the rate of addition of acidifying agent, the temperature of the alkali metal silicate pool, the concentration of the reactants and the degree of agitation of the pool. Thus, a more precise definition of when the maximum increase in viscosity occurs is not possible; although, the maximum viscosity can be determined easily for any set of conditions by measuring the viscosity of the pool periodically during the acidification reaction.

The aforementioned increase in viscosity is illustrated graphically in U.S. Pat. No. 3,325,331 and occurs whether the acidification is conducted by the simultaneous introduction of acidifying agent and aqueous alkali metal silicate into a pool of water or dilute aqueous alkali metal silicate solution; or, the acidifying agent added to a pool of alkali metal silicate, such as in a batch process.

The alkali metal silicate that can be used in the practice of the present process can be represented by the general formula, $M_2O(SiO_2)_x$, wherein M represents alkali metal, such as sodium, potassium, lithium, rubidium and cesium and wherein x is typically at least 2 and usually is in the range of between 2 and 4, including fractional numbers, and preferably is in the range between 3 and 4. The large amount of acid required to neutralize compositions wherein $x$ is less than 2 makes the acidification process objectionable from an economic standpoint although the process is operative. Preferably the alkali metal silicate is sodium silicate and the ratio of $SiO_2$ to $Na_2O$ is between 3 and 4, e.g., 3.3. The concentration of alkali metal silicate used to initiate the acidification process, i.e., the concentration of the initial pool or stream of aqueous alkali metal silicate, can vary widely. Typically, alkali metal silicate solutions containing between about 10 and about 150 grams per liter of $SiO_2$, usually about 100 grams per liter $SiO_2$, can be used. Preferably, the $SiO_2$ concentration of the initiating aqueous alkali metal silicate solution does not exceed about 150 grams per liter $SiO_2$ since, in higher concentrations, there is a serious tendency of the pool to form a viscous reaction mixture which is difficult to handle.

Any convenient acid or acidic material which is soluble in water can be used to effect the acidification reaction herein described. Such acids include hydrochloric acid, sulfuric acid, phosphoric acid, sulfurous acid, nitric acid, carbonic acid, acetic acid, as well as the acidic or partially neutralized alkali metal or ammonium salts of such acids as sodium bicarbonate, ammonium bicarbonate, sodium acid sulfate, disodium acid phosphate and the like. Gaseous acids or acid anhydrides, such as $SO_2$, (sulphur dioxide) HCl, (hydrogen chloride) $H_2S$, (hydrogen sulfide) $CO_2$, (carbon dioxide) chlorine and the like can be used readily. Thus, any acidic material which reacts with the alkali metal silicate to neutralize the alkali metal oxide portion thereof can be used. The preferred acidifying agent is carbon dioxide.

The total amount of acidifying agent used is not critical; but, should be sufficient to neutralize at least a major portion and preferably at least all of the alkali metal oxide present in the solution, including any alkali metal oxide introduced into the solution in accordance with the present process. Preferably, the amount of acidifying agent used is enough to produce precipitated silica containing less than 2 percent and, more preferably, less than 1 percent $Na_2O$. The use of such amounts of acidifying agent normally reduces the pH of the resulting precipitated silica slurry to below about 9.5.

The rate of acidification can vary widely, e.g., from about 5 minutes to 48 hours. As indicated previously, finely-divided precipitated silica having a particle size of between 0.0075 and 0.10 microns and a surface area of between about 40 and about 500 square meters per gram is desired when the pigmentary silica is used for reinforcing rubber compositions. The rate of acidification is adjusted to obtain substantially the above-described product based on other acidification conditions, such as the $Na_2O$ concentration of the alkali metal silicate solution, the acidification agent used and its concentration, and the temperature of the pool. Proper balance of the aforementioned conditions is discussed in Thornhill, U.S. Pat. No. 2,940,830, and are well known to the skilled artisan. The acidification can be conducted successfully over a period of between about 3 and 10 hours, e.g., from about 4 to about 7 hours, which period includes the time required to acidify the further alkali metal silicate added in accordance with the present process.

Conventional acidification reaction conditions can be employed in the practice of the present process. For example temperatures of between about 0°C. and about 90°C. or more commonly between 50°C. and 85°C., at atmospheric pressure are used. Typically atmospheric pressures are used; however, superatmospheric pressures can be employed if desired. In the event superatmospheric pressures are utilized, reaction temperatures of up to 120°C. or more can be used. In conducting the acidification reaction, the pool of aqueous alkali metal silicate and the resulting slurry is agitated to obtain complete and rapid reactions. When carbon dioxide is used as the acidifying agent, the agitation should be sufficient to disperse or subdivide the carbon dioxide bubbles to obtain efficient absorption of the gas into the pool.

In accordance with the present process, acidification of aqueous alkali metal silicate solution, e.g., a sodium silicate solution of about 100 grams per liter $SiO_2$, is performed until an aqueous slurry of finely-divided precipitated silica is obtained, i.e., until the silicate solution is at least partially neutralized, and until the slurry has reached or passed a viscosity of about 550 centipoises. Thereafter, further aqueous alkali metal silicate solution is added to the slurry and further acidifying agent added to the resulting mixture until the alkali metal silicate solution is substantially neutralized. The addition of further alkali metal silicate can be practiced whether the acidification process is conducted by simultaneously adding acidifying agent and aqueous alkali metal silicate solution to a reaction vessel or the process is conducted in a batch operation wherein a pool of aqueous alkali metal silicate solution is acidified by addition of the acidifying agent.

The further alkali metal silicate is added to the aqueous slurry of finely-divided precipitated silica when the viscosity of the slurry, i.e., the pool, has exceeded about 550 centipoises and preferably is added after the viscosity of the pool is between about 800 and about 1,200 centipoises. The addition of further silicate solution can take place when the pool has reached its maximum viscosity or even subsequent thereto, e.g., when the alkali metal silicate of the initial pool has been substantially neutralized. The viscosity of the slurry can be measured by a Brookfield viscometer employing a Number 2 Spindle at 50 r.p.m. with the slurry at 56°C.

The viscosity of the at least partially acidified pool of aqueous alkali metal silicate is related to the percent neutralization of the pool. Thus, stated in a different way, the further alkali metal silicate is added to the pool when the initial alkali metal silicate used to prepare the slurry of precipitated silica is between about 25 and 100 percent neutralized, e.g., between about 25 and about 70 percent neutralized, and preferably when the initial pool is between about 45 and about 60 percent neutralized. When, for example, sodium silicate havin a ratio of $SiO_2$ to $Na_2O$ of about 3.3 is used, the ratio has been found to have the following values at the following recited percent neutralization. At 25 percent neutralization, the ratio is 4.4; at 45 percent neutralization, the ratio is 6.1; at 60 percent neutralization, the ratio is 8.2; and at 75 percent neutralization, the ratio is 13.2. The percent neutralization is based upon the amount of alkali metal silicate initially added to the pool and on the production of the normal salt as distinguished from the acid salt of the alkali metal employed. In the case of sodium silicate and carbon dioxide, the normal salt is sodium carbonate as distinguished from the acid salt - sodium bicarbonate. Addition of the further alkali metal silicate when the initial pool is between 25 and 70 percent neutralized avoids agglomeration of precipitated silica particles to form many large particles.

The amount of further alkali metal silicate added to the slurry of precipitated silica can vary widely. Typically, between 10 and about 200 percent of further alkali metal silicate, based on the amount of alkali metal silicate required to form the slurry of precipitated silica, is added. Preferably between about 25 and 150 weight percent of further alkali metal silicate and, more preferably, between about 50 and about 100 weight percent of further alkali metal silicate is added to the slurry. In one embodiment of the present process and in order to achieve a significant increase in the percent solids in the filter cake (obtained by filtering the final slurry of precipitated silica) at least 15 percent and preferably at least 60 percent of further alkali metal silicate is added to the initial slurry.

The further aqueous alkali metal silicate can be added to the slurry as rapidly as the equipment will permit. However, it has been found that when the rate of addition is very fast and the amount of further alkali metal silicate added is significant, the slurry thickens rapidly; but, after about 5 minutes, fluidity of the slurry develops again, i.e., a smooth slurry is obtained. Avoidance of the thickened slurry as a result of the addition of further alkali metal silicate is obtained by adding the further alkali metal silicate slowly, e.g., over a period of 5 to 10 minutes rather than by dumping the further silicate suddenly into the slurry. Preferably, the further alkali metal silicate addition should be made at a rate (moles/unit of time) which exceeds the rate of introduction of acidification agent and preferably is at least 6 to 8 times the acid rate of addition.

When the rate of addition of further alkali metal silicate to the slurry exceeds the rate of addition of acid to the slurry, there is a tendency for the ratio of $M_2O/SiO_2$ of the slurry to decrease. For example, when sodium silicate having a $SiO_2/Na_2O$ ratio of 3.3 is used and the silicate is neutralized to between 45 and 60 percent, the addition of about 60 percent further alkali metal silicate (without further acid) will reduce the $SiO_2/Na_2O$ ratio from about 6.0–8.2 to between 5.3–4.6. When the rate of addition of further alkali metal silicate to the slurry is equal to or less than the rate of acid addition, the $SiO_2/M_2O$ ratio of the slurry tends to increase.

The concentration of the alkali metal silicate added to the slurry of precipitated silica can vary. While the concentration can be the same as that utilized to prepare the initial silica slurry, it is preferable that the concentration of the further alkali metal silicate be higher than the original alkali metal silicate. Thus, the concentration of the further alkali metal silicate solution can contain between 10 and 250 grams per liter $SiO_2$ or more. Preferably, the concentration is at least about 50 grams per liter $SiO_2$ and more preferably at least 200 grams per liter $SiO_2$, e.g., from 200 – 250 grams per liter $SiO_2$. The upper concentration limit is dependent upon the particle size of pigment desired and the fluidity of the slurry that can be handled. Higher concentrations favor higher percentages of solids in the filter cake which results in more silica product per reactor per unit of time. For example, in a typical commercial acidification process, sodium silicate containing about 100 grams per liter $SiO_2$ is used to form the initial aqueous alkali metal silicate solution. Following acidification of this solution to the desired point, further alkali metal silicate can be added thereto having 230 grams per liter $SiO_2$ or even 410 grams per liter $SiO_2$. As shown in the Examples recited hereinafter, the increase in the percentage of filter cake solids depends in great part upon the amount of further alkali metal silicate added to the slurry, i.e., generally the higher the percentage of further silicate added, the higher the percent of solids in the filter cake.

Following the addition of the further aqueous alkali metal silicate solution, additional acidifying agent is introduced to the slurry in an amount sufficient to precipitate further finely-divided silica and to neutralize the further aqueous alkali metal silicate added to the slurry as well as alkali metal silicate present from the initial slurry, if any. The total amount of acidifying agent added is typically at least the amount required to produce the normal salt of the alkali metal, and to produce a slurry containing less than 2 percent and, more preferably, less than 1 percent $Na_2O$. The further acidifying agent can be added simultaneously with the further aqueous alkali metal silicate generally. When a weak acid, i.e., one having a dissociation constant below about $1 \times 10^{-4}$ for the first hydrogen, e.g., carbonic acid, is used as the acidifying agent, the rate of addition of the further silicate generally exceeds the neutralization rate.

The surface area of the precipitated silica pigment produced as described herein can be stabilized by heating the silica at a pH above 5, preferably from 7 to 9 in an aqueous medium for a suitable period which is usually in excess of 30 minutes. In the convenient practice of the process, stabilization is effected by heating the silica slurry in its mother liquor or other aqueous medium to an elevated temperature above about 60°C., usually above the temperature at which it has been precipitated, for a time sufficient to stabilize the surface area. The time required for the heat treatment stabilization depends upon the temperature at which the heat treatment is carried out and to some extent upon the temperature at which the silica has been previously precipitated. Typically, heat treatment is accomplished at from 80° to 100°C. or above and it is usually advantageous to boil the slurry since this is a simple way of maintaining it at the desired temperature. When the slurry is maintained at its boiling temperature a heat treatment period of 30 minutes to 2 hours is usually sufficient. Following this treatment precipitated silica can be recovered by settling or filtration. For a more complete description as to the precipitation of finely-divided silica including the reaction conditions and stabilization of the pigment, reference is made to Thornhill, U.S. Pat. No. 2,940,830 which describes the aforementioned processes and which is incorporated herein by reference in its entirety.

The precipitated silica can be recovered by filtration and the filter cake washed and reslurried in water or sodium chloride solution prior to the heat treatment step described above, or the precipitated silica can be heat treated in its mother liquor and then filtered and washed, as described. Often, it is desirable to filter, wash and reslurry in order to achieve adequate removal of undesired salts from the precipitated silica. Following recovery of the precipitated silica, e.g., by filtration, the silica is dried in any suitable manner. Conveniently, it is dried in rotary dryers at temperatures between 100°C. and 300°C., e.g., 100–150°C.

The precipitated silica pigment will generally have a predominant ultimate (smallest) particle size between about 75 and 500 angstroms and a surface area of between about 40 and about 1,000 square meters per gram (B.E.T.), preferably between about 40 and 500 square meters per gram when the pigment is employed in a rubber formulation. The surface area can be obtained by degassing the silica previously dried at 105°C. in vacuum to remove residual or entrapped gas therein and then measuring the amount of nitrogen which is adsorbed by the silica under controlled temperature and pressure. The surface area is computed from this amount. The B.E.T. method is described in The Journal Of The American Chemical Society, Volume 60, page 309, et seq., Feb., 1938.

The present process results in an increased production rate for a given reactor with little additional acidification time. Because the recovered filter cake has an increased percent solids, there is a corresponding reduction in the energy requirements necessary to evaporate the water associated with the recovered pigment, e.g., the filter cake, during drying of the pigment. Further, the product is essentially the same product produced without the addition of further alkali metal silicate. It has been found that when the amount of further alkali metal silicate added is between 60 and 100 weight percent, only a very moderate increase in particle size occurs. Moreover, the slurry has improved fluidity and exhibits fast settling and filtration characteristics.

The present process is more particularly described in the following examples which are intended as illustrative only since numerous modifications and variations therein will be apparent to those skilled in the art. All parts and percentages in said examples are by weight.

EXAMPLE I

A sodium silicate solution of 30 grams per liter $Na_2O$ (100 grams per liter $SiO_2$) was made by diluting 2,826 grams of sodium silicate (6.37 percent $Na_2O$, 19.96 percent $SiO_2$), to 6 liters with distilled water. This solution was heated in a 12 liter nickel reactor to a temperature of 56°C. by a steam coil and carbon dioxide was introduced into the solution at a rate of 0.0133 mole per minute for 273 minutes and the final pH of the solution was 9.8. The mixture was, during this time, thoroughly agitated by means of a single baffle approximately 1½ × 10 inches and a 4 × ⅝ inch rectangular blade agitator powered by an air motor. The carbon dioxide was bubbled into the reactor at a position under the agitator through a razor slit in a piece of rubber tubing. During the carbon dioxide addition, it was noted that the solution became very turbid after 92 minutes. Precipitation started at about 100 minutes, at which point sufficient carbon dioxide had been added to carbonate 45.8 percent of the sodium silicate in solution. At 112 minutes, there was a substantial increase in viscosity and there was no surface motion to the thick slurry. Agitation was then increased slightly. At 165 minutes, 350 milliliters of water was added to restore evaporated water and the volume of the reactor to its original volume. Samples from the reactor were taken at various intervals and the pH of the sample measured. At 90 minutes, the pH was 11.1; at 185 minutes the pH was 10.6; at 200 minutes, the pH was 10.4; at 240 minutes, the pH was 10.0; and at 273 minutes, the pH was 9.8.

The slurry was then boiled for 1 hour and filtered by employing two 32 centimeter Buechner funnels. The filter cake was washed three times with a volume of water equal to the volume of the cake, re-slurried and acidified to a pH of 3 with 6 normal hydrochloric acid. The slurry was filtered; the filter cake water-washed five times and, after extended vacuum on the filters for about 45 minutes, the filter cake which had a solids content of 18½ percent solids, was dried at 105°C. in a forced draft oven. The ultimate particle size was 200 angstroms and the surface area 150 square meters per gram (B.E.T.).

EXAMPLE II

The procedure of Example I was repeated except that 60 percent more sodium silicate was added to the slurry immediately after the maximum viscosity was reached at 110 minutes of carbonation (50.4 percent carbonation). The thick, motionless, grainy slurry to which the further silicate was added, which had a viscosity greater than 1,000 centipoises, became very fluid within 10 minutes after the addition. The addition was made in less than 10 seconds. The temperature was raised 10°C. within 15 minutes to 66°C. to obtain an increased dissolution of some of the precipitate and then allowed to return to 56°C. over a period of 1 hour and maintained at that temperature until the carbonation was completed. The resultant smooth fluid slurry did not form a precipitate on the walls of the reactor and was easily handled. The filter cake recovered was a porous, meal-like, non-adherent product having a solids content of 27.5 percent. After drying, the cake was quite friable.

EXAMPLE III

The procedure of Example I was repeated except that 60 percent more sodium silicate was added 120 minutes after the carbonation had begun when the slurry had reached the maximum viscosity (55.1 percent carbonation). The resultant fluid slurry was grainy and filtered fast. The filter cake recovered had a 31.4 percent solids content and dried to a dusty powder and fragile lumps.

EXAMPLE IV

The procedure of Example I was repeated except that a fast carbonation rate of 0.0268 moles per minute was employed at room temperature (28°C.) through the gel state and 60 percent more sodium silicate added after 60 minutes of carbonation (55.4 percent carbonation). After 50 minutes of carbonation, a motionless, translucent gel was obtained. The gel required 15 minutes to become fluid and the temperature of the liquor was raised to 56°C. by the introduction of steam. The carbonation rate was then reduced to 0.0062 mole per minute for 2 hours and continued the following day for an additional 5.3 hours. The resultant slurry was fluid, had some grainy character and filtered very fast. The wet cake contained 29.8 percent solids, was granular and non-adherent. The product, after drying, was powder and lumps.

EXAMPLES V – VIII

The general procedure of Example I was repeated except that varying amounts of additional aqueous sodium silicate was added to the slurry when the viscosity thereof was greater than 550 but less than 1,000 centipoises. The percent by weight additions were respectively 15, 30, 45 and 150 percent.

The foregoing Examples are summarized in the following Table 1, where it can be seen that the silicate addition after the gel state favored a much higher filter cake solids content which effects a considerable saving in reducing the time required for drying the filter cake. In addition, it can be seen from the Table that silicate addition after the formation of the gel state produced a slurry which was easily filterable.

TABLE 1

| Example No. | Carbonation Temp. (°C.) | Carbonation CO₂ Moles/Min. | Time Min. | Preparation of High Filter Cake Solids Silicate Addition % by Weight | New Carbonation Rate Mole/Min. | Time Min. | Total CO₂ Time Min. | Filter Rate | Predominant Particle Size, A | Filter Cake Solids % by Weight |
|---|---|---|---|---|---|---|---|---|---|---|
| I | 56 | .0133 | — | None | — | — | 273 | Slow | 225 | 18.5 |
| II | 56+* | .0133 | 110 | 60 | — | 235 | 345 | Fast | 250 | 27.5 |
| III | 56 | .0122 | 120 | 60 | .0122 | 230 | 350 | Fast | 250 | 31.4 |
| IV | 40+* | .0268 | 60 | 60 | .0062 | 420 | 480 | Moderate | — | 29.8 |
| V | 56 | .0133 | 134 | 15 | .0244 | 106 | 240 | Moderate | — | 26.1 |
| VI | 56 | .0133 | 113 | 30 | .0240 | 122 | 235 | Fast | — | 28.0 |
| VII | 56 | .0133 | 105 | 45 | .0268 | 145 | 250 | Fast | — | 26.0 |
| VIII | 56 | .0133 | 123 | 150 | .0249 | 207 | 330 | Slow | — | 33.5 |

*Average temperature

Several compositions of the previous Examples were incorporated into rubber compositions and subjected to various standard tests. The rubber formulations of 100 grams SBR-1502 rubber, 60 grams of precipitated silica of the indicated Examples or a commercial silica pigment as a control, 4 grams zinc oxide and 1 gram of N-phenyl-2-napthylamine were mixed in a Brabender at a temperature of about 100°C. for about 3 minutes and then milled with 1.5 grams of N,N'-di-o-tolyl quanidine and 0.75 gram of 2,2-dithiobisbenzothiazole at a temperature of about 25°C. for about 10 minutes on a 7-inch mill. The formulations were cured at 300°F. for various time intervals. The test results are shown in Table 2.

TABLE 2

| Composition of Example No. | Cure 300°F. Min. | 300% Modulus psi[1] | Tensile, psi[1] | Elongation %[1] | Shore A Hardness[2] | Pico Abrasion Index, %[3] |
|---|---|---|---|---|---|---|
| Hi-Sil 233[4] | 17 | 1070 | 2910 | 550 | 88 | 75 |
| II | 17 | 1520 | 2430 | 460 | 71 | 72 |
| III | 15 | 1120 | 2130 | 540 | 71 | 59 |
| IV | 20 | 1270 | 2040 | 440 | 75 | 59 |

[1]Tested according to ASTM-D-412.
[2]Tested according to ASTM-D-314.
[3]Tested according to ASTM-D-2228-63T.
[4]Hi-Sil 233, Trademark, PPG Industries, Inc. A precipitated, hydrated silica having an ultimate particle size of 200 angstroms, a BET surface area of approximately 150 square meters per gram, and containing SiO₂ — 87.5% CaO — 0.75%, R₂O₃(Al₂O₃ + Fe₂O₃) — 0.95% NaCl — 1.6%, a weight loss at 105°C. of 6.3% and the balance is bound water.

From the data reported in Table 2, it can be seen that the rubber compositions containing silica prepared from the process of the invention have a higher modulus but lower hardness than the composition containing the commercial silica. Thus, the vulcanizates are useful as rubber mats for application to moldings or any use where high abrasion resistance is not required but where vulcanizates having high modulus and softness are desired permitting easy processability such as extrusion techniques.

Although the present process has been described with reference to specific details of certain embodiments thereof, it is not intended that such details should be regarded as limitations upon the scope of the invention except as and to the extent that they are included in the accompanying claims.

What is claimed is:

1. A method for producing finely-divided precipitated silica, which comprises acidifying an aqueous solution of alkali metal silicate with acidifying agent in an amount sufficient to precipitate finely-divided silica and thereby form a first aqueous slurry of silica, said slurry having reached a viscosity in excess of 550 centipoises, adding from 10 to 200 weight percent of further aqueous alkali metal silicate, based on the initial alkali metal silicate solution, to the slurry, adding further acidifying agent to the slurry in an amount sufficient to precipitate further finely-divided silica, and recovering the precipitated silica.

2. The method of claim 1 wherein the alkali metal silicate is representable by the formula $M_2O(SiO_2)_x$, wherein M is alkali metal and x is at least 2.

3. The method of claim 2 wherein M is sodium and x is 3.3.

4. The method of claim 1 wherein the alkali metal silicate is sodium silicate.

5. The method of claim 1 wherein the acidifying agent is carbon dioxide.

6. The method of claim 1 wherein the viscosity of the first slurry is from in excess of 550 to 2000 centipoises.

7. The method of claim 6 wherein the viscosity of the first slurry is between 800 and 1,200 centipoises.

8. The method of claim 1 wherein from 25 to 150 weight percent of further aqueous alkali metal silicate is added to the first slurry.

9. The method of claim 8 wherein from 50 to 100 weight percent of further aqueous alkali metal silicate is added to the first slurry.

10. The method of claim 1 wherein the temperature at which acidification is conducted is between 0° and 90°C.

11. The method of claim 10 wherein the temperature is between about 50° and about 85°C.

12. The method of claim 1 wherein the further aqueous alkali metal silicate is added when the initial alkali metal silicate solution is from 25 to 100 percent neutralized.

13. The method of claim 12 wherein the further aqueous alkali metal silicate is added when the initial alkali metal silicate solution is from 25–70 percent neutralized.

14. The method of claim 1 wherein the aqueous sodium silicate contains at least 50 grams per liter $SiO_2$.

15. The method of claim 1 wherein the further aqueous alkali metal silicate is added to the first aqueous slurry of silica before the further acidifying agent.

16. The method of claim 1 wherein the further aqueous alkali metal silicate is added to the first aqueous slurry of silica simultaneously with the further acidifying agent.

17. A method for producing finely-divided precipitated silica, which comprises acidifying an aqueous solution of sodium silicate representable by the formula $Na_2O(SiO_2)_{3.3}$ with carbon dioxide in an amount sufficient to neutralize between 25 and 70 percent of the aqueous sodium silicate solution and precipitate finely-divided silica and thereby form a first aqueous slurry of silica, said slurry having a viscosity in excess of 550 centipoises, adding from 50 to 100 weight percent of further aqueous alkali metal silicate, based on the initial alkali metal silicate solution, to the slurry, adding further carbon dioxide acidifying agent to the slurry in an amount sufficient to precipitate further finely-divided silica, and recovering the precipitated silica.

18. The method of claim 17 wherein the temperature of acidification is between about 50° and about 85°C.

19. The method of claim 18 wherein the initial sodium silicate solution has a concentration between about 10 and about 150 grams per liter of $SiO_2$ and the further aqueous alkali metal silicate solution has a concentration that is between 10 and 250 grams per liter of $SiO_2$ and is higher than the initial sodium silicate solution.

20. The method of claim 19 wherein the initial sodium silicate solution has a concentration of 100 grams per liter $SiO_2$ and the further aqueous alkali metal silicate solution has a concentration of from 200–250 grams per liter $SiO_2$.

* * * * *